(12) United States Patent
Roberts

(10) Patent No.: US 11,595,480 B2
(45) Date of Patent: Feb. 28, 2023

(54) SERVER SYSTEM FOR PROCESSING A VIRTUAL SPACE

(71) Applicant: Constructive Labs, Santa Cruz, CA (US)

(72) Inventor: Michael Roberts, Los Gatos, CA (US)

(73) Assignee: Constructive Labs, Santa Cruz, CA (US)

( * ) Notice: Subject to any disclaimer, the term of this patent is extended or adjusted under 35 U.S.C. 154(b) by 0 days.

(21) Appl. No.: 16/616,354

(22) PCT Filed: May 23, 2018

(86) PCT No.: PCT/IB2018/053639
§ 371 (c)(1),
(2) Date: Nov. 22, 2019

(87) PCT Pub. No.: WO2018/215942
PCT Pub. Date: Nov. 29, 2018

(65) Prior Publication Data
US 2020/0177706 A1    Jun. 4, 2020

Related U.S. Application Data

(60) Provisional application No. 62/510,195, filed on May 23, 2017.

(51) Int. Cl.
| | |
|---|---|
| *H04L 67/131* | (2022.01) |
| *A63F 13/35* | (2014.01) |
| *G06T 19/00* | (2011.01) |
| *H04L 67/01* | (2022.01) |

(52) U.S. Cl.
CPC ............ *H04L 67/131* (2022.05); *A63F 13/35* (2014.09); *G06T 19/003* (2013.01); *H04L 67/01* (2022.05)

(58) Field of Classification Search
CPC .......... H04L 67/38; H04L 67/42; A63F 13/35; G06T 19/003
See application file for complete search history.

(56) References Cited

U.S. PATENT DOCUMENTS 6,020,885 A * 2/2000 Honda ................... G06Q 10/10
709/205
6,154,211 A * 11/2000 Kamachi ............. G06F 3/04815
715/848

(Continued)

*Primary Examiner* — James R Sheleheda
(74) *Attorney, Agent, or Firm* — Yao Legal Services, Inc.; Shun Yao

(57) ABSTRACT

A server system (100) for processing a virtual space, the virtual space comprising a plurality of entities (A-E), the server system (100) comprising: one or more back-end servers (108); and one or more front-end servers (114); wherein each back-end server (108) stores a respective subset of the plurality of entities (A-E); each front-end server (114) is communicatively coupled to each back-end server (108); each front-end server (114) is configured to be communicatively coupled to one or more client devices (106); each front-end server (114) stores one or more entity references (RefA-RefE); and each entity reference (RefA-RefE) comprises a first identifier for identifying a respective entity (A-E) and a second identifier for identifying the back-end server (108) on which the entity (A-E) identified by the first identifier is stored.

16 Claims, 2 Drawing Sheets

(56) References Cited

U.S. PATENT DOCUMENTS

| | | | | |
|---|---|---|---|---|
| 6,738,807 | B1* | 5/2004 | Matsui | H04L 29/06027 709/223 |
| 8,621,368 | B2* | 12/2013 | Shuster | H04L 67/131 715/848 |
| 2009/0132931 | A1* | 5/2009 | Tatsubori | H04L 67/75 715/752 |
| 2010/0058108 | A1* | 3/2010 | Nammatsu | H04L 41/069 714/39 |
| 2010/0113159 | A1* | 5/2010 | Chapman | H04L 67/1002 463/42 |
| 2010/0146409 | A1* | 6/2010 | Yoshida | A63F 13/70 715/757 |
| 2010/0156891 | A1* | 6/2010 | Maegawa | A63F 13/12 345/419 |
| 2012/0130717 | A1* | 5/2012 | Xu | G06T 13/40 345/473 |
| 2012/0311463 | A1* | 12/2012 | Hickman | G06T 19/00 715/757 |

* cited by examiner

SERVER SYSTEM FOR PROCESSING A VIRTUAL SPACE

FIELD OF THE INVENTION

The present invention relates to server systems for processing a virtual space, including but not limited to three-dimensional virtual spaces.

BACKGROUND

Graphical programming of computers continues to grow at a rapid pace. Historically, visual programming languages have allowed users to create programs by controlling program elements graphically instead of textually. Supporting large-scale visual programming may have motivated work on virtual reality, including a head-mounted display. However, although the visual programming construct may enable rapid generation of simple programs, it does not efficiently address the issues of organization and complex navigation necessary for the generation of a complex artefact. Component-based programming (e.g., Unix, Objective C, and Smalltalk) sought to address this inefficiency by dividing the software functionality of a large application into smaller communicating units via modularity and encapsulation. Process formalisms for programming early parallel computers, along with graph theoretic approaches, are common in concurrent programming. Eventually, node-based visual content development programs enabled users with limited programming experience to visually "wire" together components from a set of pre-built modules and to perform complex "rigging" for a variety of computer graphics animation tasks.

The development of interactive environments with end-user programming predates the Internet, but such early environments were primarily textual in nature. For example, Multi-User Dungeon (MUD) and LambdaMoo rely on language for developing textual virtual realities. LambdaMoo further uses an object-oriented language in which users can extend the functionality of the world by programming scripted objects in a simple-to-use object-oriented programming language.

Commercial success for recent three-dimensional (3D) multi-user game environments (e.g., World of Warcraft) is driven by massive improvements to a PC's ability to process graphic 3D game content. Encompassing large developments budgets, these environments are typically based on a custom C or C++ coded "client" application, along with a custom coded multicomputer server back-end. At the same time, other multi-user games focus on "world building" and "player created content" (e.g., HighFidelity, SecondLife, Project Sansar, and Minecraft).

One area of graphical programming that continues to grow is the programming and viewing of interactive 3D spaces. It tends to be desirable to, on one hand, maintain the illusion of a 3D viewable shared space in which changes made to an object on one computer are transparently replicated to other computers viewing the same space, while, on the other hand, to maintain concurrency in the execution environment so that a large number of objects can be simulated in concert on a modern multi-core processor. Note that reference to a shared virtual reality space implies that the virtual reality space running on one device (and viewable by a first user wearing suitable virtual reality hardware) appears to the first user to be the same as that running on a second device as viewed by a second user (also wearing suitable virtual reality hardware connected to the second device).

Conventionally, latency for clients may be reduced for a virtual 3D space or world by implementing multiple different servers collaborating on the serving and presentation of the space (e.g. serving different real-world geographical locations). For example, the virtual space may be separated into multiple smaller regions and different, independent servers may be used to simulate users and objects within and near to a respective region. Also, for example, the functionality of the software engine that generates the virtual space may be separated, for example, function, and a different, independent server may be used to implement a respective part of that functionality. For example, players' inventories may be handled by one server, while a combat system between players may be handled by a second server, etc. Also, for example, virtual objects within the virtual space may be grouped into multiple different groups and a different, independent server may be used to simulate a respective group of objects within the virtual space.

SUMMARY OF THE INVENTION

The present inventors have realised that it is desirable to enable or facilitate an increase in the number of users or players that can interact in a common virtual 3D space or world over that which can be handled by a single server. The present inventors have realised that it is desirable to enable or facilitate an increase in the number of clients or client devices connected to a given system.

The present inventors have realised that benefits can be realised by utilising a plurality of back-end server systems (for example, to maintain and update states of the nodes) which work in combination with a plurality of front-end server systems which handle direct connection to the clients. This tends to allow for an increased number of connected clients to be supported compared to, for example, using a single multi-threaded server computer and implementing message passing to synchronize state between that single server and connected clients.

In a first aspect, the present invention provides a server system for processing a virtual space. The virtual space comprises a plurality of entities. The server system comprises one or more (e.g. a plurality of) back-end servers and one or more (e.g. a plurality of) front-end servers. Each back-end server stores a respective subset of the plurality of entities. Each front-end server is communicatively coupled to one or more (e.g. each) of the back-end servers. Each front-end server is configured to be communicatively coupled to one or more client devices, e.g. such that the one or more front end servers are coupled between the one or more back-end servers and the client devices such that communication between the client devices and the one or more back-end servers is via the one or more front-end servers. Each front-end server stores one or more entity references. Each entity reference comprises a first identifier for identifying a respective entity and second identifier for identifying the back-end server on which the entity identified by the first identifier is stored.

In some aspects, the front-end servers store only the entity references and not the entities (or copies of the entities) themselves. In some aspects, each back-end server stores a proper subset of the plurality of entities. In some aspects, across the back-end servers, each entity is stored at exactly one back-end server. The back-end servers may store definitive copies of the entities.

The virtual space may comprise a plurality of tiles. Each tile may be representative of a region in the virtual space. Each entity may be located within one or more of the tiles. Each back-end server may store a respective subset of the plurality of tiles. Each back-end server may store only some or all of the entities located in the tiles stored by that back-end server. In respect of at least one of the tiles, a plurality of back end servers may store that tile each of which stores only a proper subset of the entities located in that tile such that together they store the complete set of entities located on that tile. Each back-end server may store a proper subset of the plurality of tiles. Each back-end server may store a contiguous set of tiles.

Each front-end server may store a proper subset of the tiles, for example, based on locations within the virtual space acquired from client devices connected to that front-end server. Each front-end server may be configured to subscribe to one or more of the back-end servers based on the proper subset of the tiles stored by that front-end server and based on the tiles stored by the back-end servers. Each front-end server may be configured to subscribe to one or more of the back-end servers such that messages received by that front-end server from the back-end servers relate only to entities located within the proper subset of tiles stored by that front-end server.

Each of the front-end servers may be configured to: responsive to a connection being established between that front-end server and a client device, acquire a location in the virtual space for the client device; identify one or more tiles of the plurality of tiles based on the acquired location for the client device; and transmit, to the one or more back-end servers, a message, the message indicating the identified one or more tiles.

Each of the back-end servers may be configured to, responsive to receiving the message and responsive to determining that that back-end server stores one or more of the identified one or more tiles, transmit to the front-end server from which the message originated, respective entity information related to each entity which is located in the one or more identified tiles stored within that back-end server. Each front-end server may be configured to relay, to the client device, the entity information.

Each of the front-end servers may be configured to: receive, from a client device connected to that front-end server, a message, the message indicating a first entity of the plurality of entities and an action performed on or by the first entity; using the message, identify the back-end server on which the first entity is stored; and send the message to the identified back-end server.

Each of the back-end servers may be configured to: responsive to receiving a message indicating an entity stored by that back-end server and an action performed on or by that entity, change a state of that entity stored by that back-end server; and send to one or more of the front-end servers, a further message, the further message indicating that entity and the changed state of that entity. He further message may be the same as the message. Each back-end server may be configured to send the further message only to front-end servers that are subscribed to that back-end server with respect to that entity.

Each of the front-end servers may be configured to, responsive to receiving a message indicating an entity for which an entity reference is stored by that front-end server and a changed state for that entity, change the entity reference for that entity based on the message.

Each of the front-end servers may be configured to, responsive to receiving a message indicating an entity and a changed state for that entity, send the message to each client device connected to that front-end server.

The back-end servers may be communicatively coupled to each other, for example, via a high-capacity network system. The front-end servers may be communicatively coupled to the back-end servers a high-capacity network system.

Each entity may be selected from the group of entities consisting of: an actor; an entity; an object; an edge (which may be an object with a sender port and a receiver port); and a node with one or more ports, wherein the node can couple via edges to ports on other nodes. Each entity may be a node, each node being uniquely identified by a combination of an engine identifier and an instance identifier, and wherein a respective port can couple to one or more edges.

In a further aspect, the present invention provides a method for a server system. The server system is for processing a virtual space. The virtual space comprises a plurality of tiles and a plurality of entities. Each tile is representative of a region in the virtual space. Each entity is located within one or more of the tiles. The server system comprises one or more back-end servers and one or more front-end servers. Each back-end server stores a respective subset of the plurality of tiles. Each back-end server stores some or all of the entities located in the tiles stored by that back-end server. The server system may, for example, be in accordance with a preceding aspect. The method comprises: responsive to a connection being established between a first of the front-end servers and a client device, acquiring, by the first front-end server, a location in the virtual space for the client device; identifying, by the first front-end server, one or more tiles of the plurality of tiles based on the acquired location for the client device; transmitting, by the first front-end server, to the one or more back-end servers, a first message, the first message indicating the identified one or more tiles; responsive to receiving the first message, transmitting, by each back-end server on which is stored one or more identified tiles, to the first front-end server, respective entity information related to each entity which is located in the one or more identified tiles stored within that back-end server; and relaying, by the first front-end server, to the client device, the entity information.

The method may further comprise storing, by the first front-end server, for each entity which is located in the one or more identified tiles, a respective entity reference, wherein each entity reference comprises a first identifier for identifying a respective entity and second identifier for identifying the back-end server on which the entity identified by the first identifier is stored.

In a further aspect, the present invention provides a method for a server system. The server system is for processing a virtual space. The virtual space comprises a plurality of entities. The server system comprises one or more back-end servers and one or more front-end servers. Each back-end server stores a respective subset of the plurality of entities. The server system may, for example, be in accordance with a preceding aspect. The method comprises: receiving, by a first of the front-end servers, from a client device, a first message, the first message indicating a first entity of the plurality of entities and an action performed on or by the first entity; using the first message, identifying, by the first front-end server, the back-end server on which the first entity is stored; sending, by the first front-end server, the first message to the identified back-end server; and using the first message, changing, by the back-end server that receives the first message, a state of the first entity stored thereon.

The method may further comprise: sending, by the back-end server on which the first entity is stored, to one or more of the front-end servers, a second message, the second message indicating the first entity and the changed state of the first entity; and sending, by each front-end server that receives the second message, the second message to each client device connected to that front-end server.

In some aspects, the back-end server on which the first entity is stored only sends the second message to front-end servers that are subscribed to that back-end server with respect to the first entity.

In a further aspect, the present invention provides a program or plurality of programs arranged such that when executed by a computer system or one or more processors it/they cause the computer system or the one or more processors to operate in accordance with the method of any preceding aspect.

In a further aspect, the present invention provides a machine-readable storage medium storing a program or at least one of the plurality of programs according to ant preceding aspect.

DETAILED DESCRIPTION

Figure 1:
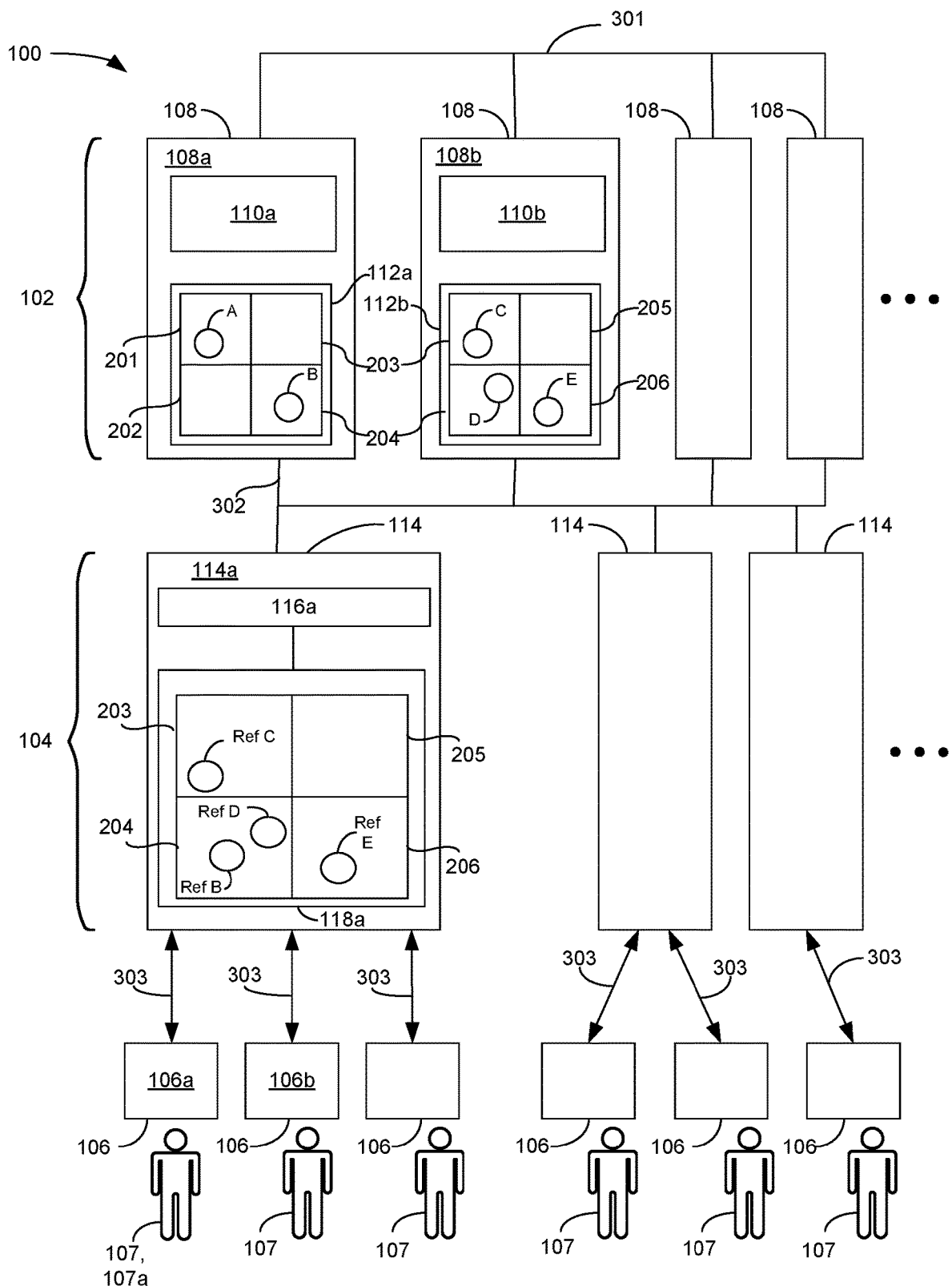
FIG. 1 is a schematic illustration (not to scale) of a system for simulating a virtual three-dimensional space.

FIG. 1 is a schematic illustration (not to scale) of an embodiment of a system 100 for processing a virtual 3D space. The system 100 may for example simulate a virtual world of an MMO video game.

In this embodiment, the system 100 processes or simulates the virtual 3D space substantially as described in International Application No.: PCT/US2017/060430, Publication No.: WO/2018/085851, "SYSTEM AND METHOD FOR FACILITATING SHARING OF VIRTUAL THREE-DIMENSIONAL SPACE", the entirety of which is incorporated herein by reference. Thus, entities and objects within the virtual 3D space may be fully functional "nodes" or "actors", which are connected to other objects via edges. Messages can be sent between nodes to update their internal states. The system 100 contains object engines containing nodes having the properties of actors. These nodes can receive messages and respond to each such message it receives by changing internal state, generating one or more new messages, or creating one or more new nodes also having actor properties.

The person skilled in the art will appreciate that the term "entity" may be used to refer to any software construct which can be conceptually considered as forming a single item of some sort, whilst the term "object" is used with its normal meaning as well known to persons familiar with object-oriented paradigms of computer software (e.g. one can instantiate an instance of an object based on its associated object class, etc.). The term "actor" may be used to refer to an element of a computer program built in accordance with the Actor Model of concurrent computing, which implies that it is an entity which communicates with other actor entities by sending messages and receiving messages, and responding to those received messages by changing state and/or by sending messages itself. In general, unless it is apparent from the context that such is not the case, most entities in the present embodiment (e.g. nodes) are objects (in the sense that they are instantiations of an associated object class) which also behave as actors (in that they send and receive messages, etc.) and thus a node may, for example, properly be referred to as either an object or an actor depending upon what properties of the node are most relevant to the context in which the term is used. Nodes can be connected to other nodes via "edges", which may also be considered to be actors in that they may send and receive messages, etc.

In this embodiment, the virtual 3D space simulated by the system 100 is divided in to a plurality of tiles. Each tile may specify a respective portion of the virtual 3D space, for example a respective region of 3D virtual terrain, or a respective volume of virtual space. In this embodiment, the tiles are contiguous and are non-overlapping. However, in other embodiments, certain the tiles may be non-contiguous and/or overlapping to some extent.

In this embodiment, the system 100 comprises a server system having a so-called "back-end" 102 and a so-called "front-end" 104. The system 100 further comprises a plurality of client devices 106 on which the virtual 3D space is rendered. Each client device 106 is operated by a respective user 107. The users 107 may operate their respective client devices 106 to interact with the virtual 3D space, as described in more detail later below with reference to FIG. 2. For example, a first user 107a may operate a first client device 106a to view and interact with the virtual 3D space displayed thereon.

The back-end 102 comprises a plurality of back-end servers 108, including a first back-end server 108a and a second back-end server 108b. Each of the back-end servers 108 comprises a respective one or more processors and one or more memories. For example, the first back-end server 108a comprises a first back-end processor 110a and a first back-end memory 112a, and the second back-end server 108b comprises a second back-end processor 110b and a second back-end memory 112b.

In this embodiment, each back-end server 108 contains (or hosts), in its memory, a proper subset of the tiles that make up the virtual 3D space. Preferably, each back-end server 108 contains contiguous tiles.

Multiple different back-end servers 108 may store the same tile. In this example, the first back-end server 108a stores, in the first back-end memory 112a, a first tile 201, a second tile 202, a third tile 203, and a fourth tile 204. Also, the second back-end server 108b stores, in the second back-end memory 112b, the third tile 203, the fourth tile 204, a fifth tile 205, and a sixth tile 206. Thus, in this example, copies of the third and fourth tiles 203, 204 are maintained by both the first and second back-end servers 108a-b.

In this embodiment, the nodes of the virtual 3D space are allocated to respective back-end servers 108. Each node is allocated to only a single back-end server 108 such that two different back-end servers 108 are not allocated the same node. Each back-end server 108 stores and maintains (i.e. keep updated) definitive copies of the nodes that have been allocated to it. Thus, the back-end servers 108 may be thought of as "definitive copy" servers. The nodes are not replicated across the back-end servers 108.

In this embodiment, each node is identified using a respective node identifier, which in this embodiment is a 128-bit UUID identifier. Also, each back-end server 108 is identified using a respective server identifier, which in this embodiment is a 128-bit UUID identifier. Also, each tile is identified using a respective tile identifier, and are addressable (for message sending purposes) via hash-map using these tile identifiers.

The nodes may be thought of as being located within tiles. Node information (e.g. node internal state, node identifiers, etc.) are stored in the memory of the back-end server 108 to which the node has been allocated. Nodes that are located within the same tile may be allocated to different back-end servers 108. Thus, for tiles that contain a large number of nodes, computational load involved in processing those nodes may be distributed between multiple different back-end servers 108. In this example, a first node A is located with the first tile 201 and is stored by the first back-end server 108a, a second node B is located in the fourth tile 204 and is stored by the first back-end server 108a, a third node C is located in the third tile 203 and is stored by the second back-end server 108b, a fourth node D is located in the fourth tile 204 and is stored by the second back-end server 108b, and a fifth node E is located in the sixth tile 206 and is stored by the second back-end server 108b.

In this embodiment, each back-end server 108 stores and maintains a respective spatial data structure which links together the tiles and nodes stored by that back-end server 108. The spatial data structure of a back-end server 108 includes a set of references to nodes simulated in that back-end server 108 and a set of tiles stored in that back-end server 108. In some embodiments, the spatial data structure of a back-end server 108 contains references to only those nodes on that particular back-end server 108, and does not contain references to other nodes on other back-end servers 108. However, in other embodiments, a back-end server can contain a replica of a node on another back-end server. Thus, in some embodiments, the spatial data structure of a back-end server 108 may contain a reference to a node on another back-end server. This may be done, for example, for the purpose of relaying a message when a node has "moved" to another back-end server.

Each tile contains a reference to each of the nodes located in that tile, and the node locations within the tile. Also, each node contains a reference to the tile in which that node is located, as well as its location within that tile.

The nodes may be allocated to the back-end servers 108 storing the relevant tile in any appropriate way, for example, randomly, pseudo-randomly, according to some function, or according to some distribution (e.g. a uniform distribution).

Each back-end server 108 is configured to process nodes it stores, for example responsive to receiving messages indicating that node states should be updated. In this embodiment, the processors (e.g. processors 110a and 110b) of the back-end servers 108 process the nodes stored in the back-end server memories. The processing or simulation of nodes may be carried out in the same manner as that described in PCT/US2017/060430, i.e. using thread-confined simulators. The simulation of nodes may comprise implementing a blocking queue-model, extracting incoming messages and calling methods, setting node properties, and creating node children, etc. for the nodes it is simulating. In some cases, the evaluation of a new state for a node may lead to the composition of a message for use by another node, and the sending of that message by relevant back-end server 108.

In this embodiment, the back-end servers 108 maintain definitive copies of the nodes. Thus, the canonical copy of the system state is maintained in the lattice of back-end servers 108.

Edges between nodes may also be stored and processed by the back-end servers 108. In some implementations, an edge contains an identifier for the target of the edge (i.e. a "sink" node), which can potentially be a node on a different back-end server 108 to the back-end server 108 storing the edge. In some implementations, an edge contains a reference to an in-memory "source" node which may be stored in the same back-end server memory.

The back-end servers 108 are communicatively connected together by a first communication link 301 such that messages may be sent between the back-end servers 108. For example, messages resulting from the evaluation of other messages may be sent from one back-end server 108 to another back-end server 108. Also, if a back-end server 108 accidentally receives a message addressed to a node on another back-end server 108, it can redirect that message to the correct back-end server 108 containing that node.

The first communication link 301 can be implemented using a high-capacity network system such as InfiniBand (IB). Other communication systems, including but not limited to peer-to-peer communication systems such as communication using raw sockets or shared-memory, may be implemented. Such communication systems tend to have improved bandwidth and latency compared to, say, Ethernet. Thus, the back-end servers 108 tend to be able to communicate directly with lower latency while the front-end servers 114 handle the relatively latency intensive process of communicating with the client devices 106.

Each back-end server 108 stores (in its memory) and maintains a lookup table, or other index, which identifies, for each node (identified by its UUID), on which back-end server 108 (identified by its UUID) that node is stored. Thus, for example, the first back-end server 108a may look up, in its lookup table stored in its memory 112a, a given node identifier, and send a message addressed to that node on the looked up back-end server 108. The first back-end server 108a can have a good degree of confidence that the message will arrive at its intended location. These lookup tables may be updated in any appropriate manner, for example using a "gossip protocol".

In this embodiment, a routing system maps the back-end server identifiers (i.e. the back-end server UUIDs) to physical sockets or a similar memory based, InfiniBand, or similar communication mechanism between the back-end servers 108. A node on one back-end server 108 can thus address a message to another node, and the routing system will handle the transmission of the message to the back-end server 108 which is serving that node.

The front-end 104 comprises a plurality of front-end servers 114, including a first front-end server 114a. Each of the front-end servers 114 comprises a respective one or more processors and one or more memories. For example, the first front-end server 114a comprises a first front-end processor 116a and a first front-end memory 118a.

The front-end servers 114 are communicatively connected to the back-end servers 108 by a second communication link 302 such that messages may be sent between the front-end and back-end servers 114, 108, for example, as described in more detail later below with reference to FIG. 2. The second communication link 302 can be implemented using a high-capacity network system such as InfiniBand (IB). Such a communication system tends to have improved bandwidth and latency compared to, say, Ethernet. Thus, the front-end and back-end servers 114, 108 tend to be able to communicate directly with low latency. The front-end servers 114 may be communicatively connected to each other, e.g. by the second communication link 302.

In this embodiment, one or more client devices 106 are connected to each of the front-end servers 114. For example, as shown in FIG. 1, three client devices 106, including the first client device 106*a*, are connected to the first front-end server 114*a*. The client devices 106 are connected to the front-end servers 114 via respective third communication links 303. The third communication links 303 may be, for example, Ethernet cables.

In this embodiment, each front-end server 114 contains only those tiles that are visible to the client devices 106 and users 107 connected to that front-end server 114.

When a client device 106 connects to a front-end server 114 for the first time, the client device 106 provides an initial location or position for itself in the virtual 3D space. Using this initial location, the front-end server 114 computes a set of tiles that the user 107 of the client device 106 can see. For example, the font-end server 114 may identify a set of tiles in the vicinity of the client device 166/user 117 within the virtual 3D space. This may be, for example, a 3×3, 5×5, or larger, grid of tiles with the client device 106/user 107 in the centre. The front-end server 114 then broadcasts a message to all of the back-end servers 108 requesting the back-end servers 108 to subscribe that front-end server 114 to the relevant tiles. The back-end servers 108 maintain their subscriptions. The back-end servers 108 then send, to the requesting front-end server 144, tile information for the requested (i.e. subscribed to) tiles as well as node state information for the nodes on those tiles. The front-end server 114 then initialises the received tiles with node references (the node states themselves are not stored by the front-end servers 114). A node reference for a node may comprises the node identifier, the position, class, and back-end server identifier for that node. The front-end server 114 then sends the content for the visible tiles (i.e. the node state information), via the third communication links 303, to the client devices 106 connected to the front-end server 114. The virtual 3D space and virtual objects therein are then rendered client-side by the client devices 106 and viewed by the users 107. The client devices 106 will continue to receive updates from the back-end servers 108 via the front-end servers 114, e.g. in the event that internal states of relevant nodes (e.g. nodes in visible or subscribed tiles) are updated. In some embodiments, after the initial state is transferred to the client devices 106, only "RootCause" messages are sent to the client devices 106. Each client device 106 may run its own state simulation for derivative state.

By way of example, as shown in FIG. 1, the third, fourth, fifth, and sixth tiles 203-206 are visible by the users 107 of the client devices 106 connected to the first front-end server 114*a*. Thus, the first front-end server 114*a* hosts only those tiles 203-206. The first back-end server 108*a* contains the third and fourth tiles 203, 204, and the second back-end server 108*b* contains the third, fourth, fifth, and sixth tiles 203-206. Thus, the first front-end server 114*a* is subscribed to the third and fourth tiles 203, 204 with the first back-end server 108*a*, and to the third through sixth tiles 203-206 with the second back-end server 108*b*. The third through sixth tiles 203-206 contain the second node B, the third node C, the fourth node D, and the fifth node E. Thus, the first front-end sever 114*a* stores a reference to the second node B (i.e. "RefB", which contains a node identifier for node B, the position of node B in the fourth tile 204, and an identifier for the first back-end server 108*a* on which node B is hosted), a reference to the third node C (i.e. "RefC", which contains a node identifier for node C, the position of node C in the third tile 203, and an identifier for the second back-end server 108*b* on which node C is hosted), a reference to the fourth node D (i.e. "RefD", which contains a node identifier for node D, the position of node D in the fourth tile 204, and an identifier for the second back-end server 108*a* on which node D is hosted), and a reference to the fifth node E (i.e. "RefE", which contains a node identifier for node E, the position of node E in the sixth tile 206, and an identifier for the second back-end server 108*a* on which node E is hosted). The first front-end server 114*a* sends information relating to the third, fourth, fifth, and sixth tiles 203-206 and the second node B, the third node C, the fourth node D, and the fifth node E to the client devices 106 (including the first client device 106*a*) connected to it. Those client devices 106 process and render the received information thereby to display some or all of the third through sixth tiles 203-206 and the objects B-E to their respective users 107.

Each front-end server 114 stores (in its memory) and maintains a lookup table, or other index e.g. a hashmap, which identifies, for each node (identified by its UUID), on which back-end server 108 (identified by its UUID) that node is stored. Thus, for example, the first front-end server 114 may look up, in its lookup table stored in its memory 118*a*, a given node identifier, and send a message addressed to that node on the looked up back-end server 108. The first back-end server 108*a* can have a good degree of confidence that the message will arrive at its intended location. These lookup tables may be updated in any appropriate manner, for example using a "gossip protocol". Advantageously, the lookup tables (or other indexes) do not have to be completely up-to-date. If, for example, a message for a first node is sent to an old (i.e. out-of-date) location of that first node, a second node located at the old location of the first node can forward the message to the first node's new location. This may occur multiple times before the message reaches the first node.

The front-end servers 114 may each maintain a respective list of tiles which other front-end servers 114 are hosting. These lists may be updated via gossip protocol. The front-end servers 114 may each maintain user load statistics for the other front-end servers 114. In some implementations, in cases where a client device 106 connects to a front-end server 114 which does not already have the relevant tiles for that client device 106, the front-end server 114 may consult its tile list or index to determine the best front-end server 114 for that client device 106 (i.e. which front-end server 114 already has the appropriate tiles for that client device 106). The front-end server may subsequently redirect the client device to the identified other front-end server 114.

In some implementations, one or more front-end servers 114 may "steal" or copy tiles from one or more other front-end servers 114, thereby avoiding consulting the back-end servers 108. This may, for example, be performed during initialisation of the front-end servers 114.

In this embodiment, all servers, nodes, edges and messages flowing in the system are identified using a respective 128-bit UUID identifier which may be generated using a variant of the well-known Snowflake Algorithm, or a similar distributed identifier generation scheme.

Apparatus, including servers, processors, and memories, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

Preferably, the back-end servers at least are implemented as virtual servers so that new virtual servers can "spin-up" as needed automatically, for example, if demand increases (e.g. because of surge in the number of users logging on to the system). Naturally, the front-end servers could also be implemented as virtual servers in a similar manner.

Figure 2:
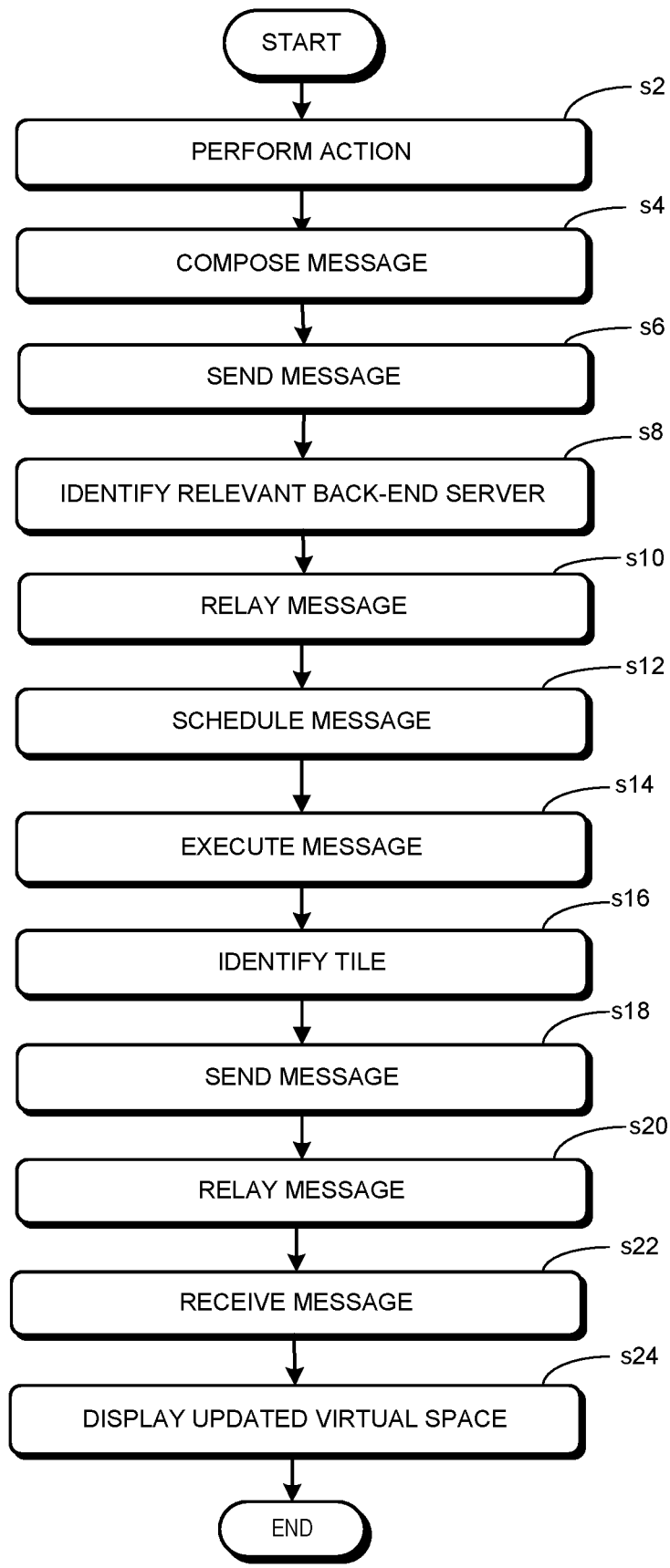
FIG. 2 is a process flow chart showing certain steps of a method implementable by the system.

FIG. 2 is a process flow chart showing certain steps of a method that may be performed by the system 100 described in more detail earlier above with reference to FIG. 1. The method shown in FIG. 2 and described in more detail below may be implemented to simulate the virtual 3D space.

It should be noted that certain of the process steps depicted in the flowchart of FIG. 2 and described below may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the first user 107a performs an action using the first client device 106a. In this embodiment, the first user 106a controls the first client device 106a to change (e.g. move or change the colour of) a virtual object currently being displayed on the first client device 106a. In this embodiment, the virtual object interacted with by the first user 107a corresponds to a node, for example the third node C.

In this embodiment, the first client device 106a may update its locally stored state of the relevant node, for example if the node is "optimistic" (or, more precisely, if the action performed on the virtual object—which action has resulted in the change in the object such as a movement to a new position or a change in its colour—is one which can be reasonably modelled in an optimistic manner—e.g. pushing the object by a certain distance in a certain direction, where multiple pushes, e.g. from other nearby users, would vectorially sum with the first push such that the order in which the pushes were executed would not affect the final position of the object). For example, the first client device 106a may update its locally stored state of the third node C to reflect the action performed by the first user 107a.

At step s4, responsive to the user input, the first client device 106a composes a first message. This first message comprises the unique identifier (e.g. the UUID) for the node corresponding to the virtual object interacted with by the first user 107a (which in this example is the third node C), and the action performed by the first user 107a (e.g. the movement or the change of colour). Thus, in this example the first message is addressed to the third node C.

The first message may further comprise a message identifier, which uniquely identifies the message. The first message is an identified object.

At step s6, the first client device 106a sends the first message to the front-end server 114 to which it is connected, i.e. the first front-end server 114a, via its third communication link 303.

At step s8, using the received first message, the first front-end server 114a identifies the back-end server 108 to which the node identified in the first message is assigned, i.e. the back-end server 108 responsible for maintaining the definitive copy of the third node C. Thus, in this example, using the received first message, the first front-end server 114a identifies the second back-end server 108b.

This identification of the relevant back-end server 108 may be performed by the first front-end sever 114a looking up, using the node identifier contained in the received first message, in its stored lookup table or hashmap, the unique identifier for the back-end server 108 hosting the definitive copy of the identified node.

The first front-end sever 114a may save the message identifier of the first message, for example in a time-evicting hash set associated with the originating client device (i.e. the first client device 106a). In some implementations, this is done (e.g. only done) in cases where the first message has already been optimistically executed by the originating client device 106 so as to prevent (or at least minimise the risk of) the message returning to that client device 106.

At step s10, the first front-end sever 114a relays the first message to the identified back-end server 108, which in this example is the second back-end server 108b.

At step s12, the second back-end server 108b schedules or sequences the received first message with respect to other messages it has received in order to assure correct time-domain behaviour. This scheduling or sequencing may be performed, for example, as described in PCT/US2017/060430, the contents of which are incorporated herein by reference.

At step s14, the second back-end server 108b executes the first message and changes the state of the relevant node. In particular, in this example, the second back-end server 108b modifies the stored state of the third node C as specified in the received first message so as to reflect the action performed by the first user 107a at step s2, e.g. to move or change the colour of the third node C. This execution of the received first message may cause further messages to be generated and sent along edges connected to the third node C, to other nodes which may be hosted by other back-end servers 108.

In some implementations, execution of the first message may include modifying the connections or edges to one or more nodes (e.g. the indicated node).

At step s16, the second back-end server 108b identifies the tile in which the modified node is located. In particular, in this example, using the received unique identifier of the third node C, the second back-end server 108b identifies the tile which contains the third node C, i.e. the third tile 203.

In this embodiment, the reference to third tile 203 is in the third node C as part of that node's state. However, in some embodiments, the identification of the relevant tile may be performed by the second back-end sever 108b looking up, using the node identifier contained in the received message, in its stored lookup table or hashmap, the unique identifier for the tile which contains the identified node.

In some cases, e.g. where action by a user 107 moves a virtual object from one tile to another tile, multiple tiles may be identified.

At step s18, the second back-end server 108b sends a second message specifying the updated state of the relevant node (i.e. the third node C) to each of the front-end servers 114 that are subscribed to the identified tile (i.e. the third tile 203) with the second back-end server 108b. This second message may be identical to the first message. The second message may comprise a node identifier for the relevant node, a tile identifier that identifies the tile in which that node is located, and may specify updated state information for that node.

Thus, the second back-end server 108b sends the second message specifying the updated state information for the third node C to one or more different front-end servers 114, including, in the present embodiment, at least the first front-end server 114*a*. Note that in some embodiments, the second back-end server 108*b* could determine that there is no need to send the second message back to the first front-end server 114*a* and in such case determines not to do so—e.g. because it is determined that the first front-end server 114*a* only has the first user 107*a* subscribed to it who can view the object corresponding to the third node C and that the message relates to an action which the first user device will have optimistically already updated on its copy of the third node C).

At step s20, each front-end server 114 that receives the second message relays that second message to each of the client devices 106 connected to it which are subscribing to the relevant tile. Preferably, each front-end server 114 relays the second message to its (relevant) client devices 106 in parallel.

The front-end servers 114 may also update their stored references, for example, to reflect the updated position of the node (in particular, to update the tile in which that node is stored if it has moved tile as a result of the action performed on it), or to account for the hosting of that node being moved from one back-end server 108 to a different back-end server 108. The target node and tile for the received message may be identified using the node identifier and/or the target identifier contained within the received message.

In this example, the first front-end server 114*a* forwards the state update information for the third node C to each of the three client devices 106 connected to it, including the first client device 106*a*.

At step s22, each client device 116 that receives the second message updates is stored system state and engines on those client devices render the updated virtual 3D space. The updated virtual 3D space is displayed on the client devices 106 to each respective user 107 viewing the virtual object associated with the third node C.

Thus, a method that may be performed by the system 100 is provided.

Advantageously, the above described system tends to facilitate the hosting of an increased number of users and client devices in a common virtual 3D space.

In the above described system and method, instead of clients connecting directly to a single back-end server, they connect to a front-end server which itself is subscribed to one or more back-end servers and which only maintains a limited portion of the virtual 3D space.

Advantageously, the number of front-end servers can be scaled (e.g. increased or decreased) independently from the back-end servers. Each front-end server may have its own set of ethernet interfaces. Thus, bandwidth availability may be improved.

Advantageously, the network (i.e. the communication links) between the front-end and back-end servers, and between the back-end servers themselves, can be implemented using a high-capacity network system such as Infini-Band. This tends to achieve better bandwidth and latency compared to, say, ethernet links. Thus, the back-end servers can communicate directly with lower latency while the front-end servers handle the relatively latency intensive process of communicating with the clients.

Advantageously, a client device may be instructed or made to connect to a front-end server that is supporting client devices with similar locations in the virtual space. The client devices subscribe to tiles on the front-end server, which link to tiles stored at the back-end servers. Thus, instead of pushing out changes to many clients directly from the back-end, the back-end pushes out changes to a relatively small number of front-end servers, and those front-end servers push out changes to their connected clients. This "fan-out" approach tends to greatly reduce the time complexity of the back-end broadcasting data to the clients.

Advantageously, the above described system allows for simple object creation. When an object is created, that object may be allocated (e.g. at random) to a back-end server that contains the tile in which that object is located. Other mechanisms for picking a server, such as round-robin, modified by server load, could also be applied here.

In the above embodiments, the system is as shown schematically in FIG. 1. However, in other embodiments, the system may be different to that shown in FIG. 1. For example, the system may comprise a different number of back-end servers, a different number of front-end servers, a different number of client devices, a different number or arrangement of tiles, and/or a different number or arrangement of node to that shown in FIG. 1.

In the above embodiments, the back-end servers store and maintain the definitive copies of the nodes. However, in other embodiments, as described in PCT/US2017/060430, the definitive copy of any given node may reside on any machine which is part of the total system, including, for example, a client device. In such a case, the back-end servers between them still maintain at least one copy of the node, but it is a replica copy of the node like that stored in every other client device which is also maintaining a non-definitive replica copy of that node. The significance of one of the nodes being a definitive copy is just that all root cause messages pertinent to that node are routed to the definitive copy of the node for processing of the messages (possibly in the order in which they are received at the definitive node when they are being processed in a non-optimistic manner) before the new state of the definitive node is communicated to all of the other non-definitive copies of the node. The non-definitive copy of the node stored on the back-end server still plays an important role in distributing messages relating to the state of that node to all of the client devices containing a replica non-definitive copy of that node. In particular, a sequence such as the following could occur if a user whose user device (say 106*b*) performs an action on a non-definitive replica copy of a node (say node C) for which the definitive copy of the node is stored on another user device (say 106*a*). Firstly, user device 106*b* sends a message (via its connected front-end server, to the back-end server responsible for hosting a (non-definitive) copy of node C. The back-end server then forwards the message towards the definitive copy of the node (e.g. via the front-end server to which user-device 106*a* is connected). Once received at the user device 106*a* which is hosting the definitive copy of node C, the message is processed at user device 106*a* and then the resulting new state of node C is sent in a new message back via the respective front-end server to the back-end server hosting a (non-definitive) copy of node C—when this message is received at the relevant back-end server, the state of the replica copy of node C at the back-end server is updated accordingly and the message is also forwarded back to all front-end servers subscribing to node C (i.e. storing a reference to node C) and these front-end servers then forward this message on to all of their connected user devices (including user device 106*b*) hosting a non-definitive copy of node C, which then update the state of their locally stored non-definitive replica copy of node C.

Note that in general if a message is inadvertently sent to the wrong device (e.g. if a root cause message, which requires processing by the device hosting the definitive copy of an affected node, is received at a device which does not host the definitive copy of that node; or if a redundant state-update message (informing of a state update which has already been performed at a particular node) is received at the device hosting that copy of the already updated node) it will either be ignored or forwarded on to the correct device as appropriate. Techniques for handling efficient message routing in such cases etc. are described in PCT/US2017/060430 and can of course be advantageously adopted in the present embodiments.

In the above embodiments, the nodes are not replicated across the back-end servers. However, in other embodiments, one or more back-end servers may maintain and store a replica of a node also hosted on a different back-end server. In some implementations, a replica of a node may be created by a back-end server, and that replica (or indeed the original node) may be sent to a different back-end sever. This tends to be beneficial when nodes are moved between tiles.

In some embodiments, back-up servers or failover servers may be implemented to provide redundancy in the system, e.g. to the back-end servers. Failover capability in the system may be provided, for example, by providing one or more (generally dormant) failover servers for each "active copy" back-end server. In some implementations, front-end servers continually check liveness for the back-end active copy and failover servers. If an active copy server fails, the front-end (e.g. a front-end server connected to the active copy of the server and to a corresponding failover copy of the server) can elect to "promote" a dormant failover server to active status. That server will then publish the nodes it is hosting to other servers using the gossip protocol. In the situation where a definitive active copy server attempts to communicate with a failed active copy server, that server can store the message it was trying to send until it receives gossip on the location of the new, promoted active copy server. Thus, loss of messages tends to be reduced or eliminated.

The above described system and method tend to allow for at least the following communications operations: front-end servers relaying incoming messages from clients to back-end servers; back-end servers sending outgoing messages (from themselves) to front-end servers; front-end servers sending messages coming to them from the back-end servers to clients. Additionally, back-end servers may send messages to other back-end servers. In cases where, back-up or failover servers are implemented, the back-end servers may send all the messages they receive to their back-up servers. The back-up servers merely absorb state and never send messages to other servers, unless they are "promoted" to be "active copy" servers, e.g. by the front-end.

The method described in more detail above with reference to FIG. 2 illustrates the updating of the internal state of one or more nodes. It will be appreciated by those in the art that the method is equally applicable to other entities in the system, for example objects other than nodes.

In the above embodiments, the virtual space is a 3D virtual space. However, in other embodiments, the virtual space is a different type of virtual space, e.g. a 2D virtual space.

The present disclosure also include the following clauses:

Clause 1. A server system for processing a virtual space, the virtual space comprising a plurality of entities, the server system comprising:
one or more back-end servers; and
one or more front-end servers; wherein:
each back-end server stores a respective subset of the plurality of entities;
each front-end server is communicatively coupled to each back-end server;
each front-end server is configured to be communicatively coupled to one or more client devices;
each front-end server stores one or more entity references; and
each entity reference comprises a first identifier for identifying a respective entity and a second identifier for identifying the back-end server on which the entity identified by the first identifier is stored.

Clause 2. The system of clause 1, wherein each back-end server stores a proper subset of the plurality of entities.

Clause 3. The system of clause 1, wherein, across the back-end servers, each entity is stored at exactly one back-end server.

Clause 4. The system of clause 1, wherein the back-end servers store definitive copies of the entities.

Clause 5. The system of clause 1, wherein:
the virtual space comprises a plurality of tiles;
each tile is representative of a region in the virtual space;
each entity is located within one or more of the tiles;
each back-end server stores a respective subset of the plurality of tiles; and
each back-end server stores only some or all of the entities located in the tiles stored by that back-end server.

Clause 6. The system of clause 5, wherein, in respect of at least one of the tiles, a plurality of back end servers store that tile each of which stores only a proper subset of the entities located in that tile such that together they store the complete set of entities located on that tile.

Clause 7. The system of clause 5, wherein each back-end server stores a contiguous set of tiles.

Clause 8. The system of clause 5, wherein:
each front-end server stores a proper subset of the tiles; and
each front-end server is configured to subscribe to one or more of the back-end servers based on the proper subset of the tiles stored by that front-end server and based on the tiles stored by the back-end servers.

Clause 9. The system of clause 5, wherein:
each front-end server stores a proper subset of the tiles; and
each front-end server is configured to subscribe to one or more of the back-end servers such that messages received by that front-end server from the back-end servers relate only to entities located within the proper subset of tiles stored by that front-end server.

Clause 10. The system of clause 5, wherein each front-end server stores a proper subset of the tiles based on locations within the virtual space acquired from client devices connected to that front-end server.

Clause 11. The system of clause 5, wherein each of the front-end servers is configured to:
responsive to a connection being established between that front-end server and a client device, acquire a location in the virtual space for the client device;
identify one or more tiles of the plurality of tiles based on the acquired location for the client device; and
transmit, to the one or more back-end servers, a message, the message indicating the identified one or more tiles.

Clause 12. The system of clause 11, wherein each of the back-end servers is configured to:
responsive to receiving the message and responsive to determining that that back-end server stores one or more of the identified one or more tiles, transmit to the front-end server from which the message originated, respective entity information related to each entity which is located in the one or more identified tiles stored within that back-end server.

Clause 13. The system of clause 12, wherein each front-end server is further configured to relay, to the client device, the entity information.

Clause 14. The system of clause 1, wherein each of the front-end servers is configured to:

receive, from a client device connected to that front-end server, a message, the message indicating a first entity of the plurality of entities and an action performed on or by the first entity;

using the message, identify the back-end server on which the first entity is stored; and send the message to the identified back-end server.

Clause 15. The system of clause 1, wherein each of the back-end servers is configured to:

responsive to receiving a message indicating an entity stored by that back-end server and an action performed on or by that entity, change a state of that entity stored by that back-end server; and send, to one or more of the front-end servers, a further message, the further message indicating that entity and the changed state of that entity.

Clause 16. The system of clause 15, wherein each back-end server is configured to send the further message only to front-end servers that are subscribed to that back-end server with respect to that entity.

Clause 17. The system of clause 1, wherein each of the front-end servers is configured to, responsive to receiving a message indicating an entity for which an entity reference is stored by that front-end server and a changed state for that entity, change the entity reference for that entity based on the message.

Clause 18. The system of clause 1, wherein each of the front-end servers is configured to, responsive to receiving a message indicating an entity and a changed state for that entity, send the message to each client device connected to that front-end server.

Clause 19. The system of clause 1, wherein the back-end servers are communicatively coupled to each other.

Clause 20. The system of clause 19, wherein the back-end servers are communicatively coupled to each other via a high-capacity network system.

Clause 21. The system of clause 1, wherein the front-end servers are communicatively coupled to the back-end servers via a high-capacity network system.

Clause 22. The system of clause 1, wherein each entity is selected from a group of entities consisting of: an actor, an entity, an object, an edge which is an object with a sender port and a receiver port, and a node with one or more ports; wherein the node can couple via edges to ports on other nodes.

Clause 23. The system of clause 22, wherein each entity is a node, each node being uniquely identified by a combination of an engine identifier and an instance identifier, and wherein a respective port can couple to one or more edges.

Clause 24. A computer-executable method for processing, by a server system, a virtual space, the virtual space comprising a plurality of tiles and a plurality of entities, each tile being representative of a region in the virtual space, each entity being located within one or more of the tiles, the server system comprising one or more back-end servers and one or more front-end servers, each back-end server storing a respective subset of the plurality of tiles, each back-end server storing some or all of the entities located in the tiles stored by that back-end server, the method comprising:

responsive to a connection being established between a first of the front-end servers and a client device, acquiring, by the first front-end server, a location in the virtual space for the client device;

identifying, by the first front-end server, one or more tiles of the plurality of tiles based on the acquired location for the client device;

transmitting, by the first front-end server, to the one or more back-end servers, a first message, the first message indicating the identified one or more tiles;

responsive to receiving the first message, transmitting, by each back-end server on which is stored one or more identified tiles, to the first front-end server, respective entity information related to each entity which is located in the one or more identified tiles stored within that back-end server; and relaying, by the first front-end server, to the client device, the entity information.

Clause 25. The method of clause 24, further comprising: storing, by the first front-end server, for each entity which is located in the one or more identified tiles, a respective entity reference, wherein each entity reference comprises a first identifier for identifying a respective entity and second identifier for identifying the back-end server on which the entity identified by the first identifier is stored.

Clause 26. A computer-executable method for processing, by a server system, a virtual space, the virtual space comprising a plurality of entities, the server system comprising one or more back-end servers and one or more front-end servers, each back-end server storing a respective subset of the plurality of entities, the method comprising:

receiving, by a first of the front-end servers, from a client device, a first message, the first message indicating a first entity of the plurality of entities and an action performed on or by the first entity;

using the first message, identifying, by the first front-end server, the back-end server on which the first entity is stored;

sending, by the first front-end server, the first message to the identified back-end server; and using the first message, changing, by the back-end server that receives the first message, a state of the first entity stored thereon.

Clause 27. The method of clause 26, further comprising: sending, by the back-end server on which the first entity is stored, to one or more of the front-end servers, a second message, the second message indicating the first entity and the changed state of the first entity; and sending, by each front-end server that receives the second message, the second message to each client device connected to that front-end server.

Clause 28. The method of clause 27, wherein the back-end server on which the first entity is stored only sends the second message to front-end servers that are subscribed to that back-end server with respect to the first entity.

Clause 29. A non-transitory computer-readable storage medium storing instructions that when executed by a computer cause the computer to perform a method for processing, by a server system, a virtual space, the virtual space comprising a plurality of tiles and a plurality of entities, each tile being representative of a region in the virtual space, each entity being located within one or more of the tiles, the server system comprising one or more back-end servers and one or more front-end servers, each back-end server storing a respective subset of the plurality of tiles, each back-end server storing some or all of the entities located in the tiles stored by that back-end server, the method comprising:

responsive to a connection being established between a first of the front-end servers and a client device, acquiring, by the first front-end server, a location in the virtual space for the client device;

identifying, by the first front-end server, one or more tiles of the plurality of tiles based on the acquired location for the client device;

transmitting, by the first front-end server, to the one or more back-end servers, a first message, the first message indicating the identified one or more tiles;

responsive to receiving the first message, transmitting, by each back-end server on which is stored one or more identified tiles, to the first front-end server, respective entity information related to each entity which is located in the one or more identified tiles stored within that back-end server; and relaying, by the first front-end server, to the client device, the entity information.

Clause 30. A non-transitory computer-readable storage medium storing instructions that when executed by a computer cause the computer to perform a method for processing, by a server system, a virtual space, the virtual space comprising a plurality of entities, the server system comprising one or more back-end servers and one or more front-end servers, each back-end server storing a respective subset of the plurality of entities, the method comprising:

receiving, by a first of the front-end servers, from a client device, a first message, the first message indicating a first entity of the plurality of entities and an action performed on or by the first entity;

using the first message, identifying, by the first front-end server, the back-end server on which the first entity is stored;

sending, by the first front-end server, the first message to the identified back-end server; and using the first message, changing, by the back-end server that receives the first message, a state of the first entity stored thereon.

The invention claimed is:

1. A server system for processing a virtual space, the virtual space comprising a plurality of entities corresponding to software components in the virtual space, the server system comprising:
   a plurality of back-end servers; and
   a plurality of front-end servers; wherein:
      the virtual space comprises a plurality of tiles, each tile representing a region in the virtual space, and each tile comprising a set of entities from the plurality of entities;
      each back-end server of the plurality of back-end servers stores a set of contiguous tiles of the plurality of tiles and state information associated with a subset of the set of entities in each of the contiguous tiles;
      first and second back-end servers of the plurality of back-end servers store a same tile of the plurality of tiles;
      state information associated with different entities within the same tile is separately stored on the first and second back-end servers;
      each front-end server of the plurality of front-end servers is communicatively coupled to one or more back-end servers of the plurality of back-end servers and communicatively coupled to one or more client devices;
      each front-end server stores a set of tiles of the plurality of tiles visible to the one or more coupled client devices and entity references for the set of entities in each tile of the set of tiles without storing state information associated with the set of entities; and
      each entity reference comprises a first identifier for identifying an entity and a second identifier for identifying a back-end server of the plurality of back-end servers on which state information associated with the identified entity is stored.

2. The system of claim 1, wherein each back-end server of the plurality of back-end servers stores a proper subset of the plurality of entities.

3. The system of claim 1, wherein each of the first and second back-end servers stores only a proper subset of entities located in the same tile such that together they store a complete set of entities located in the same tile.

4. The system of claim 1, wherein:
   each front-end server is configured to subscribe to one or more of the plurality of back-end servers based on the set of tiles stored by the front-end server and based on the set of contiguous tiles stored by each back-end server.

5. The system of claim 1, wherein:
   each front-end server is configured to subscribe to one or more of the plurality of back-end servers such that messages received by the front-end server from the subscribed one or more back-end servers relate only to entities located within the set of tiles stored by the front-end server.

6. The system of claim 1, wherein:
   each front-end server is configured to:
      responsive to a connection being established between the front-end server and a client device of the one or more client devices, acquire a location in the virtual space for the client device;
      identify one or more tiles of the plurality of tiles that are visible to the client device based on the acquired location for the client device; and
      transmit, to the plurality of back-end servers, a message, the message indicating the identified one or more tiles.

7. The system of claim 6, wherein each back-end server is configured to:
   responsive to receiving the message and responsive to determining that the back-end server stores one or more of the identified one or more tiles, transmit, to the front-end server from which the message is originated, respective entity information related to each entity which is located in the one or more identified tiles stored within the back-end server; and
   wherein the front-end server is further configured to relay, to the client device, the respective entity information.

8. The system of claim 1, wherein:
   each front-end server is configured to:
      receive, from a client device of the one or more client devices coupled to the front-end server, a message, the message indicating a first entity of the plurality of entities and an action performed on or by the first entity;
      based on the message, identify a back-end server of the plurality of back-end servers on which the first entity is stored; and
      send the message to the identified back-end server.

9. The system of claim 1,
   wherein each back-end server is configured to:
      responsive to receiving a message indicating an entity stored by the back-end server and an action performed on or by the entity, change a state of the entity stored by the back-end server; and send, to one or more of the plurality of front-end servers, a further message, the further message indicating the entity and the changed state of the entity stored by the back-end server; and wherein the back-end server is configured to send the further message only to front-end servers of the plurality of front-end servers that are subscribed to the back-end server with respect to the entity stored by the back-end server.

10. The system of claim 1, wherein the plurality of back-end servers are communicatively coupled to each other via a high-capacity network system, and wherein the plurality of front-end servers are communicatively coupled to the plurality of back-end servers via a high-capacity network system.

11. The system of claim 1, wherein each entity of the plurality of entities is selected from the group of entities consisting of: an actor; an object; an edge which is an object with a sender port and a receiver port;

and a node with one or more ports, wherein the node can couple via edges to ports on other nodes.

12. A computer-executable method for processing, by a server system, a virtual space, the virtual space comprising a plurality of tiles corresponding to regions in the virtual space, each tile comprising a set of entities corresponding to software components in the virtual space, a each entity of the set of entities being located within one or more of the tiles, the server system comprising a plurality of back-end servers and a plurality of front-end servers, a each back-end server of the plurality of back-end servers storing a set of contiguous tiles of the plurality of tiles and state information associated with a subset of the set of entities in each of the contiguous tiles, the method comprising:

responsive to a connection being established between a first front-end server of the plurality of front-end servers and a client device, acquiring, by the first front-end server, a location in the virtual space for the client device;

identifying, by the first front-end server, one or more tiles of the plurality of tiles visible to the client device based on the acquired location for the client device, wherein the first front-end server stores references for one or more entities of the set of entities in the identified one or more tiles without storing state information associated with the one or more entities;

transmitting, by the first front-end server, to the plurality of back-end servers, a first message, the first message indicating the identified one or more tiles, wherein first and second back-end servers of the plurality of back-end servers store a same tile of the plurality of tiles, and wherein state information associated with different entities within the same tile is separately stored on the first and second back-end servers;

responsive to receiving the first message, transmitting, by a third back-end server storing the one or more identified tiles, to the first front-end server, state information associated with a first entity which is located in the one or more identified tiles; and relaying, by the first front-end server, to the client device, the state information associated with the first entity.

13. The method of claim 12, wherein a reference for the first entity comprises a first identifier for identifying the first entity and a second identifier for identifying the third back-end server on which the first entity is stored.

14. A computer-executable method for processing, by a server system, a virtual space, the virtual space comprising a plurality of tiles, each tile representing a region in the virtual space, and each tile comprising a set of entities corresponding to software components in the virtual space, the server system comprising a plurality of back-end servers and a plurality of front-end servers, a each back-end server of the plurality of back-end servers storing a set of contiguous tiles of the plurality of tiles and state information associated with a subset of the set of entities in each of the contiguous tiles, first and second back-end servers of the plurality of back-end servers store a same tile of the plurality of tiles, and state information associated with different entities within the same tile is separately stored on the first and second back-end servers, the method comprising:

receiving, by a first front-end server of the plurality of front servers, from a client device, a first message, the first message indicating a first entity of the set of entities and an action performed on or by the first entity, wherein the first front-end server stores a set of tiles of the plurality of tiles visible to a plurality of client devices coupled to the firstfront-end server and entity references for the set of entities in each tile of the set of tiles without storing state information associated with the set of entities;

using the first message, identifying, by the first front-end server based on the stored references, a third back-end server of the plurality of servers on which state information associated with the first entity is stored;

sending, by the first front-end server, the first message to the identified third back-end server; and using the first message, changing, by the identified third back-end server that receives the first message, a state of the first entity stored thereon.

15. The method of claim 14, further comprising:

sending, by the third back-end server on which the first entity is stored, to one or more of the plurality of front-end servers, a second message, the second message indicating the first entity and the changed state of the first entity; and sending, by a second front-end server of the plurality of front servers that receives the second message, the second message to a client device of the plurality of client devices coupled to the second front-end server.

16. The method of claim 15, wherein the third back-end server on which the first entity is stored only sends the second message to one or more of the plurality of front-end servers that are subscribed to the third back-end server on which the first entity is stored with respect to the first entity.

* * * * *